March 31, 1953     W. H. MORGAN ET AL     2,633,307
CASTING REEL
Filed Dec. 29, 1948     5 Sheets-Sheet 1
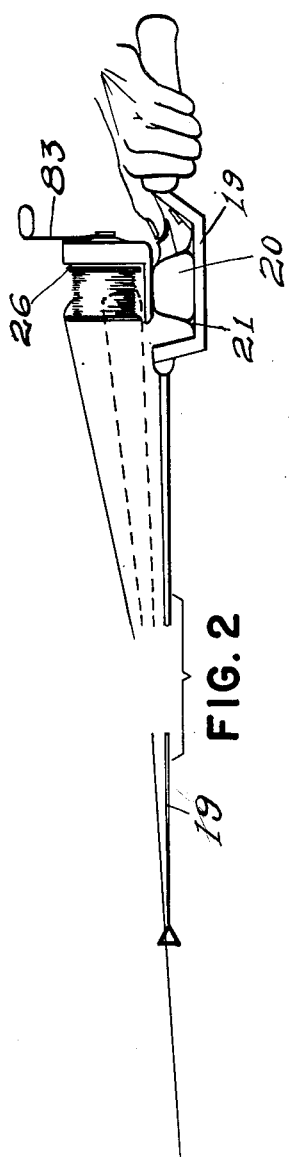
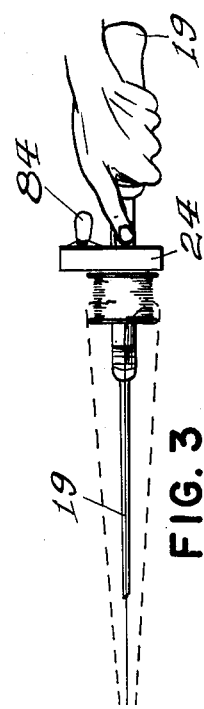
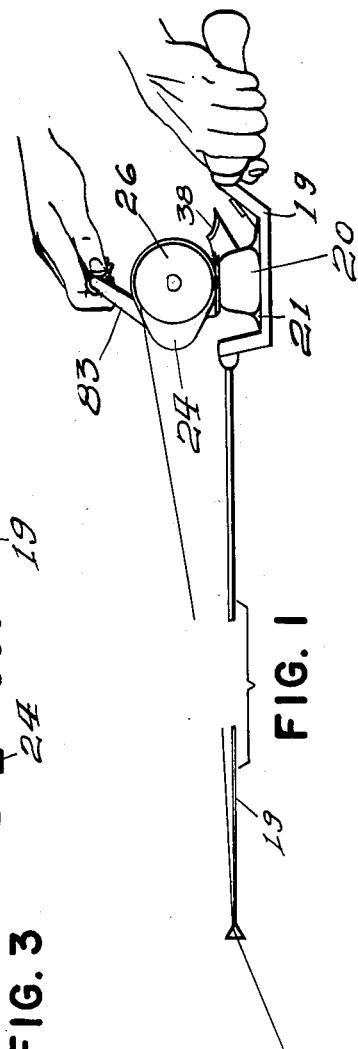
WILLIAM H. MORGAN
JOHN P. ETCHEVERRY
*INVENTORS*
BY *Albert J. Fihe*
ATTORNEY March 31, 1953 W. H. MORGAN ET AL 2,633,307
CASTING REEL Filed Dec. 29, 1948 5 Sheets-Sheet 2

WILLIAM H. MORGAN
JOHN P. ETCHEVERRY
INVENTORS

BY Albert J. Fihe
ATTORNEY

March 31, 1953 W. H. MORGAN ET AL 2,633,307
CASTING REEL
Filed Dec. 29, 1948 5 Sheets-Sheet 3
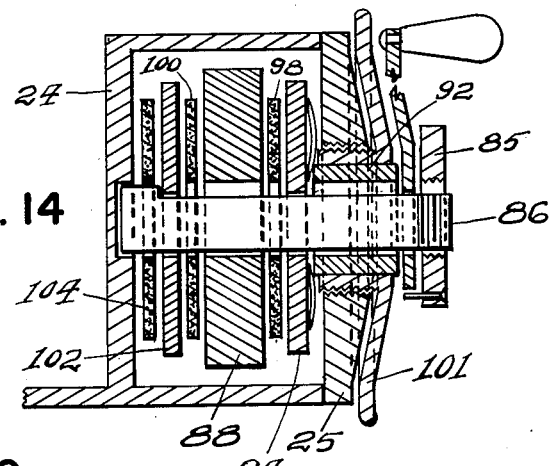
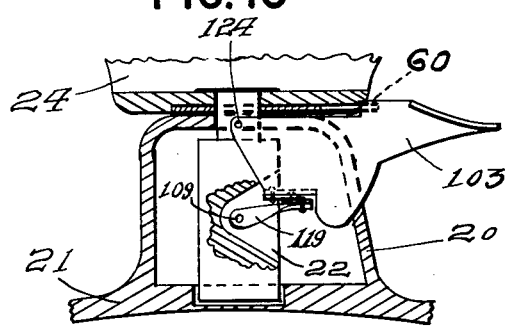
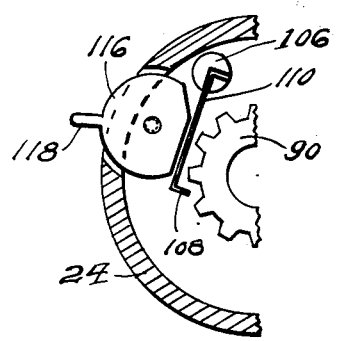
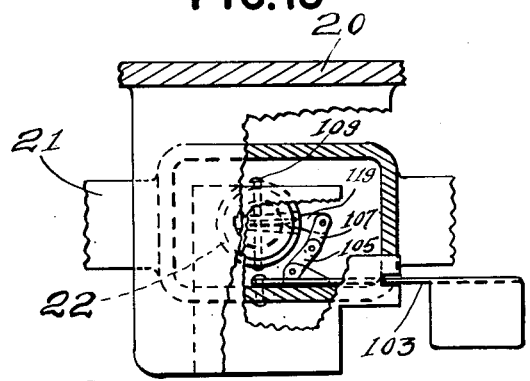
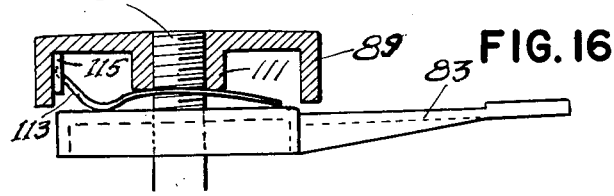
WILLIAM H. MORGAN
JOHN P. ETCHEVERRY
*INVENTORS*
BY *Albert J. Fihe*
ATTORNEY March 31, 1953 W. H. MORGAN ET AL 2,633,307
CASTING REEL
Filed Dec. 29, 1948 5 Sheets-Sheet 4
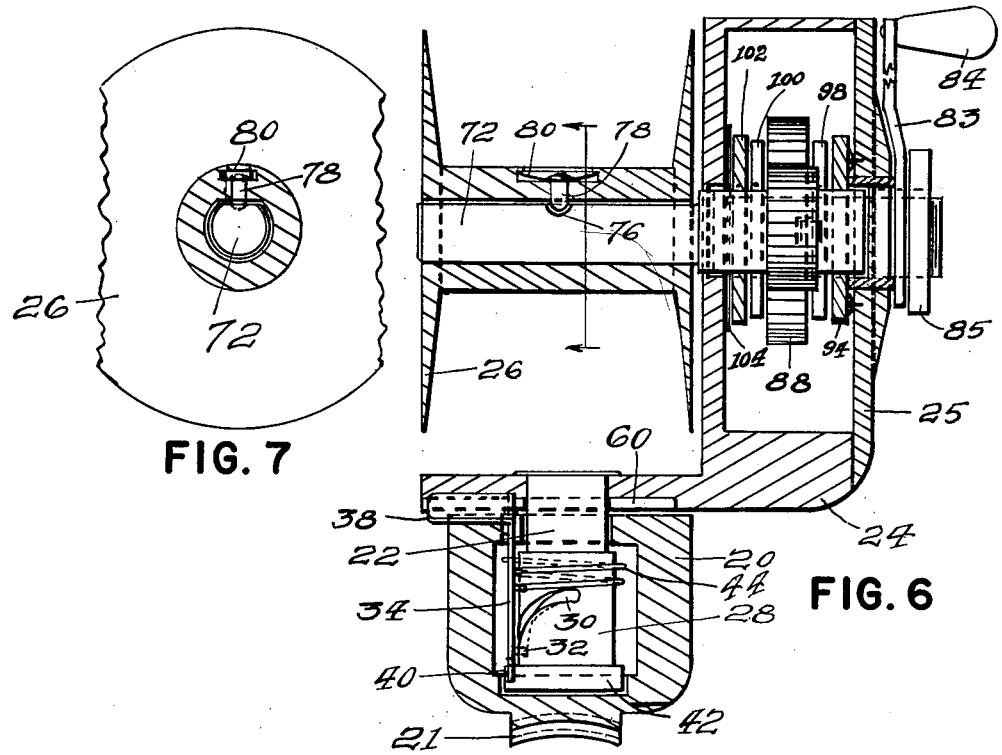
FIG. 7
FIG. 6
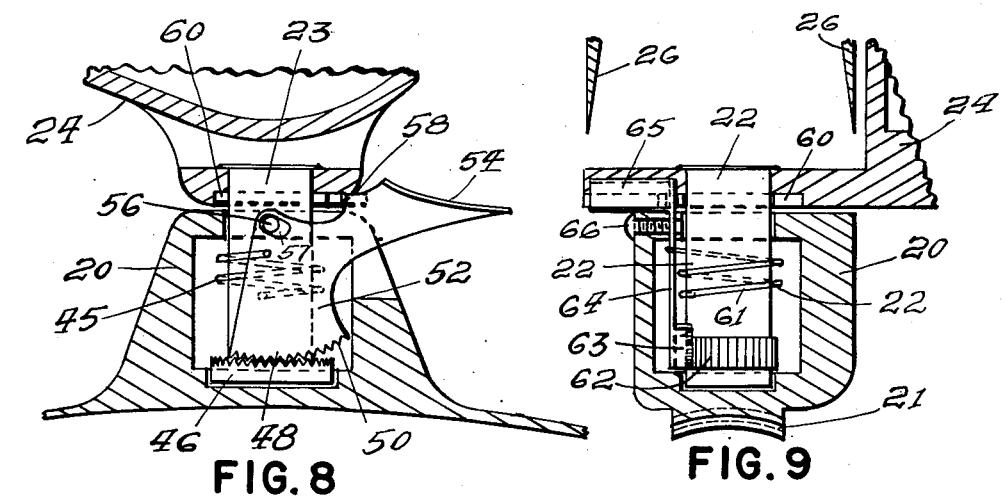
FIG. 8
FIG. 9
WILLIAM H. MORGAN
JOHN P. ETCHEVERRY
INVENTORS
BY Albert J Fihe
ATTORNEY March 31, 1953 W. H. MORGAN ET AL 2,633,307
CASTING REEL
Filed Dec. 29, 1948 5 Sheets-Sheet 5
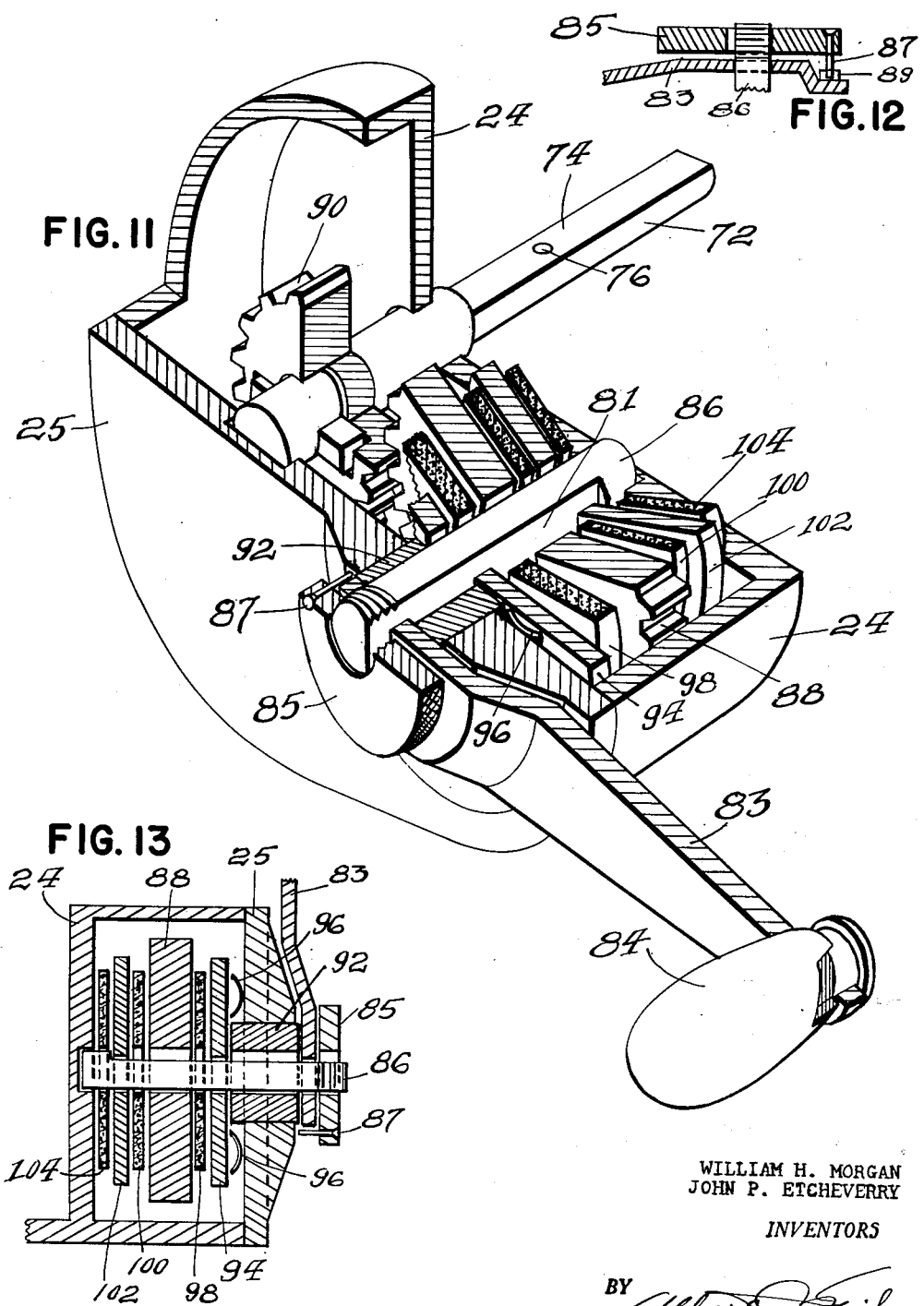
WILLIAM H. MORGAN
JOHN P. ETCHEVERRY
INVENTORS
BY *Albert J. Bihe*
ATTORNEY Patented Mar. 31, 1953

2,633,307

UNITED STATES PATENT OFFICE 2,633,307

CASTING REEL

William H. Morgan, Glendale, and John P. Etcheverry, Burbank, Calif.

Application December 29, 1948, Serial No. 68,006

4 Claims. (Cl. 242—84.5)

This invention relates to an improved casting reel and has for one of its principal objects the provision of a fishing reel which will be so constructed that the line will readily and freely unwind from the spool without spinning the spool. This is known as a "free spinning" reel among fishermen.

One of the important objects of this invention is to provide a fishing reel, particularly adapted for casting, wherein the spool upon which the line is wound or reeled can be turned through approximately ninety degrees from its reeling-in position on the rod, whereupon the line, when the bait is being cast, will be pulled off around one flange of the spool, allowing the spool to remain completely stationary while the line is being payed out.

A still further important object of the invention is to provide, in a casting reel, means for practically instantaneously turning the spool upon which the line is wound, through a quarter turn, so that the spool will not rotate during the casting operation, thereby presenting an advantage over many conventional reels wherein the spool acquires too much momentum and then revolves faster than the line runs out. This causes what is known as "backlash," which is undesirable.

Another object of the invention is to eliminate, in a casting reel, the necessity of friction which is ordinarily applied to the spool by the thumb of the angler when a cast is made. This frictional control requires considerable skill and if not properly applied the line may break or become tangled.

Yet another object of the invention is to provide, in a casting reel of the type described, means for automatically returning the spool to its normal winding position after the cast is made, so that rewinding of the line can be immediately and readily accomplished whenever desired or necessary.

Another object of this invention is the provision, in a casting reel, of means whereby the spool can be positively locked against rotation while a cast is being made, whereby if the operator wishes to retard or wholly stop the cast for any reason, he may do so by simply releasing pressure on the mechanism which turns the spool through ninety degrees, whereupon the spool will automatically return to its first position, but due to its being locked against rotation, the flight of the bait will be immediately checked.

Other and further important objects of the invention will be apparent from the disclosures in the accompanying drawings and following specification.

The invention, in a preferred form, is illustrated in the drawings and hereinafter more fully described.

In the drawing:

Figure 1 is a side elevation of the improved casting reel of this invention showing the same as applied to a fishing rod and with the reel in normal line-winding position.

Figure 2 is a side elevation similar to Figure 1, but showing the spool turned through ninety degrees and with the line unwinding around the flange of the spool.

Figure 3 is a top view of the rod and reel showing the same in a casting position similar to that illustrated in Figure 2.

Figure 5 is a detail view illustrating one form of the gear locking means.

Figure 6 is a detail view, partly in section, illustrating the reel and spool mounting and a slotted cam for turning the same.

Figure 7 is a sectional view, taken on the line 7—7 of Figure 6, illustrating the removable and reversible mounting of the spool on its shaft.

Figure 8 is a detail view, partly in section, showing a modified form of the means for turning the spool and reel through its arc.

Figure 9 shows still another form of this particular feature of the invention.

Figure 10 illustrates a further modification of the means for turning the spool through a quadrant.

Figure 11 is a detail perspective view, parts being broken away, illustrating the construction of the clutch and gear combination, by which the spool is operated.

Figure 12 is a detail of the control for the frictional clutch showing the same as associated with the handle in such a relationship that it will not accidentally come off and be lost.

Figure 13 is a detail view, partly in section, showing the clutch and gear construction of Figure 11 and illustrating the frictional adjustment and the relationship between the assembled parts.

Figure 14 is a view somewhat similar to Figure 13 but showing a frictional form of locking means for the spool.

Figure 15 is a top view of some of the structure shown in Figure 10.

Figure 16 shows another means for securing the clutch adjusting nut against loss.

As shown in the drawings:

Figure 4:
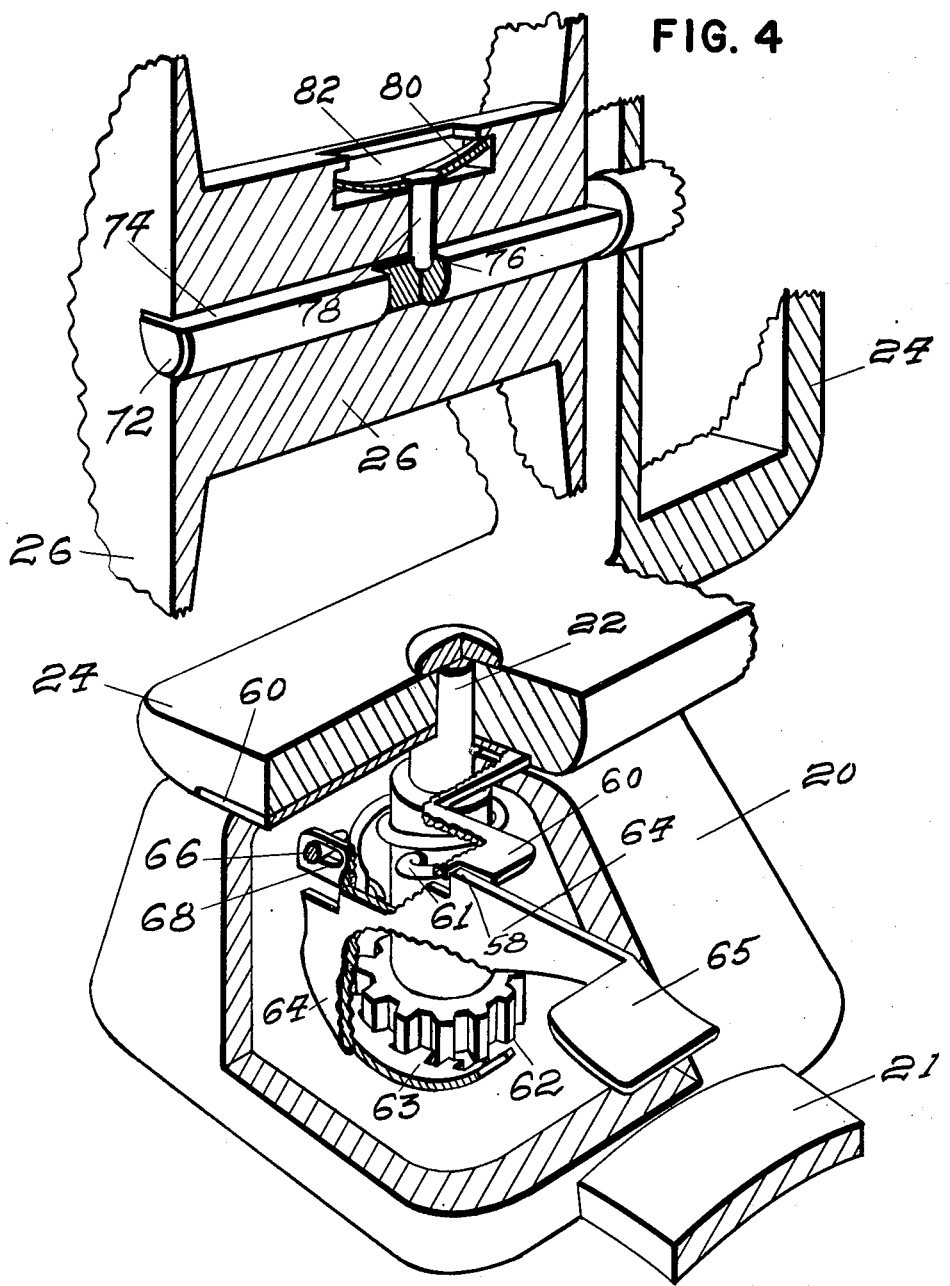
Figure 4 is an enlarged perspective sectional view of the spool, the reel mounting and one form of its rotatable support, parts being broken away to show interior construction.

The reference numeral 19 indicates generally a fishing rod of any desired construction to which the reel of this invention can be applied. The reel itself includes a supporting base 21, which is so constructed that the reel can be mounted on almost any type of rod.

Surmounting the base and integral therewith is a housing or casting 20 in which is rotatably positioned a shaft or spindle 22 and which, in turn, supports another housing 24 which is also preferably a casting. The housing 20 encloses the means for turning the reel and spool through ninety degrees with regard to the rod and the housing 24 encloses the gears and clutch construction by means of which a spool 26 is rotated for winding the line.

In that form of the invention illustrated in Fig. 6, the shaft 22 has a sleeve 28 mounted thereon, which sleeve is provided with a cam slot 30, shaped as shown, and in which a pin or follower 32 is adapted to operate.

This follower 32 is at the lower end of a lever 34 pivoted on the housing 20 and which terminates at its upper end in a pedal or the like 36 adapted to be depressed by the thumb or finger of the operator.

The lower end of the lever 34 is provided with an extension 40 (Figure 6) adapted to fit in a notch in an annular shoulder 42 mounted on the cam sleeve 28. This is for the purpose of assuring a proper and positive repositioning of the reel spool and housing when the same are returned to their normal position after being operated by the thumb latch 38. The return of the housing 24 and the spool 26 to normal position and the thumb latch 38 to locking position is accomplished by means of a spring 44 which surrounds the cam sleeve 28 and has one end fastened thereto and the other end fastened to the thumb latch lever 34 in such a manner that the shaft 22 will always be constrained to return to its normal operating position. The upper forward edge of the lever 34 fits into a slot 60 in a plate beneath the housing 24, thereby locking the housing into line reeling position after a cast has been completed.

Another means for turning the reel through its arc is illustrated in Figure 8, wherein a gear 46 is fixed at the lower end of the shaft 23 and this gear is in mesh with and is operated by a segmental gear 48 which is at the lower end of and forms part of a lever or plate 52 similar to the lever 34 and which is provided with a thumb latch 54. This plate is pivotally mounted on the casing 20 by means of a pin or the like 56. A slot 57 is formed in the plate 52 and the mounting pin 56 is fitted into this slot. When the thumb latch 54 is depressed, some lost motion occurs in the pivoting of the plate 52 about the pin 56, allowing depression of the latch to a slight extent before the gears 46—48 begin to move.

An integral projection 58 on the plate 52 is adapted to fit into a notch formed in a plate 60 attached to the under face of the gear housing 24. This assures of a proper repositioning of the housing and reel when pressure on the thumb latch 54 is released. A helical spring 45 returns the members to initial position.

It will be noted that depression of the thumb latch 54 initially moves the projection 58 out of the slot or notch in the plate 60 whereupon the gear housing 24 is then free to turn to the casting position when the lever is further and fully depressed. When the housing is returned to its initial position by the action of the spring 45, the projection 58 is also automatically moved into the notch in the plate by the action of the spring, thereby locking all the elements in desired original position. This in-and-out movement and consequent alternate freeing and locking action of the projection 58 is made possible by virtue of the slot 57.

A further embodiment of the invention is illustrated in Figures 4 and 9, wherein a gear 62 is mounted on the lower end of the shaft 22 and this is operated by an inturned segmental or crown gear 63 on a lever 64 and latch plate 65 similar to the plate 52 and latch 54. This lever 64 is mounted on a pin 66 in the housing 20 and this mounting includes a slot or lost motion arrangement similar to that shown in Figure 8 whereby a more positive repositioning and locking of the reel is assured. This lost motion arrangement comprises an elongated slot 68 in the plate 64 at the point where it is fixed on the pivot pin or screw 66. A spring 61 returns the parts to normal position.

The spool 26 is removably and reversibly mounted on a shaft 72 which projects from the gear housing 24 and the projecting end of this shaft is flattened at 74 so as to accommodate a similarly flattened inside portion of the spool hub. (Figure 4). A slight depression or hole 76 is formed at the middle of the flattened portion of the shaft 72 and the end of a spring pressed pin 78 fits into this depression or seat 76 when the spool is properly fitted onto the shaft 72. The spring which impels the pin 78 into spool locking position is shown at 80 in Figures 6 and 7 and is fitted into a recess 82 in the spindle or hub of the spool. This enables the spool to be readily pulled off the shaft 72 but, at the same time, assures of a positive driving action when winding the line.

This method of fastening the spool on the middle of its shaft in releasable driving relationship therewith enables ready reversal of the spool whenever desired. This reversal at intervals prevents undesirable twisting and consequent tangling of the line. Such compensation for undesirable line twisting must be made when a spool and reel of this type is employed. If the line is continually unwound from the spool over one flange it will finally become so twisted that snarls will result. Periodic reversal of the spool eliminates this difficulty.

A handle 83 and knob 84 is provided for winding the spool when it is on the shaft 72 and the handle itself is mounted on a shaft 86 rotatably positioned in the gear housing 24. This shaft is flattened for a portion of its length as shown at 81. A gear 88 is loosely and rotatably mounted on the shaft 86 and this in turn meshes with a smaller gear 90 which is fixed on the shaft 72.

In order that the rate of rotation of the spool can be easily controlled, a set of clutch elements is mounted on the shaft 86 adjacent the gear 88. In a suitable opening in the cover 25 for the housing 24, is a sleeve 92 in which the shaft 86 can rotate freely. Positioned around the inner projecting end of the sleeve 92 is a spring washer 96 which is so constructed as to always exert an inward pressure against a plate or washer 94 which is adjacent the inner end of the sleeve 92 and contacts the same.

This plate or disc 94 is keyed onto the flattened portion of the shaft 86 and acts as a clutch element for driving the gear 88. Between the washer or disc 94 and the gear 88 is a fibre washer or the like 98 which serves as a friction clutch element. Another such fibrous friction clutch element is on the other side of the gear 88 and is illustrated at 100. A further metal disc or washer 102 is keyed on the shaft 86 and between this metal disc and the adjacent inner facing of the housing 24 is another friction element 104.

The handle 83 is loosely keyed onto the shaft 86 and is held thereon by means of a rotatable knurled nut 85 which is screw-threaded onto the shaft 86. A small screw 87 is fixed in the knurled nut 85 adjacent its periphery and the inner end of this screw projects into the space between the inside face of the knurled nut 85 and the outer face of the handle hub. A protuberance 89 (Figure 12) is formed on the handle hub in the circular path of the end of the screw 87 and when the screw is turned into its maximum depth in the knurled nut 85 its end will project sufficiently to contact this protuberance 89 when the nut is turned. This will prevent the nut from being turned through more than one revolution so that it cannot come off and possibly be lost. However, whenever the necessity arises, the nut 85 can be removed by first backing up the screw 87.

Rotation of the knurled nut 85 in one direction pulls the shaft 86 outwardly by pushing the hub of the handle against the sleeve 92, thereby forcing the discs and washers of the clutch construction into tighter relationship. Rotation of the nut 85 in the other direction loosens this frictional engagement and in this manner the winding and unwinding drag on the reel can be accurately regulated and controlled.

The position and operating relationship of the knurled nut 85 on the end of the shaft 86 is preliminarily set so that the above described friction drive can be controlled throughout a considerable range within one revolution of the nut, but obviously a different setting can be had by simply backing up the screw 87 so as to allow its end to pass the protuberance 89 one or more times in either direction.

The cover plate 25 fastened onto the outer face of the housing 24 holds the handle, shafts, gears, clutch plates and spring washer in assembled operative relationship. The spring washer 96 is so constructed that there will always be a certain amount of frictional resistance to turning of the shaft 86 whereby undesirable free-spooling on the back-cast is prevented.

A latch is provided for positively locking the gears 88 and 90 against rotation, this being in the form of a projection 108 on the end of a leaf spring 110 which is mounted in a boss 106 on the inner face of the plate 25 (Fig. 5). The inturned end or projection of the leaf spring is adapted to be pushed into position between any of the teeth of the gear 90 by means of a cam 116 which is rotated by a lever 118, the end of which projects outside the casing 24. When this lever is turned in one direction, the cam acts against the spring and pushes the projection into position between any two of the teeth of the gear 90 thereby locking the gear shafts and spool against rotation.

Even though the handle 84 is turned after this lock is set, the gear 88 cannot rotate because it is loosely mounted on the shaft 86, being driven only by the plates 94 and 102 operating against the sides of the gear through the friction clutch elements 98 and 100. Obviously, if the gear 90 is locked, the gear 88 in mesh therewith cannot turn although the clutch discs 94 and 102 will turn with the shaft 86.

Instead of the spool locking means shown in Fig. 5, the construction illustrated in Figure 14 may be employed. This includes a rotatable flat knurled nut 101 which has an integral screw threaded extension fitted into a correspondingly internally screw threaded opening in the cover plate 25 of the housing 24. This screw threaded extension surrounds the sleeve 92 and it will be obvious that rotation of the flat knurled nut 101 in one direction will lock the friction clutch elements 94, 98, 100, 102 and 104 and the gear 88 into such a tight relationship against the rear inside face of the housing 24 that turning of the gear will be positively prevented. This action, of course, differs from the action of the knurled nut 85, which pulls the clutch elements into gripping relationship with the gear 88.

Figures 10 and 15 disclose a further means for turning the shaft 22 and the housing 24 through the required ninety degree arc. In this construction, a thumb lever 103 is provided, pivoted at 124 on the housing 20, and this operates a series of links 105—107 which are connected to the shaft 22 by another link 119 pivoted on a pin 109 and in such fashion that depression of the lever 103 will turn the shaft 22 through the desired arc by pulling the link 119 downwardly and to the left as shown in Figure 15.

Another means of retaining the nut 89 on the shaft 86 and against the handle 83 is illustrated in Figure 16, wherein an inside boss 111, integral with the nut 89, operates against a leaf spring 113 which surrounds the shaft 86 and a small protuberance 115 is fixed on the inner face of the depending skirt of the nut 89. The boss 111 pushes against the spring 113 in such fashion that when the knurled nut 89 is turned downwardly the spring will be flattened and its projecting end will move upwardly and will clear the projection 115. However, when the rotation of the knurled nut 89 is reversed, the spring will buckle and its projecting end 113 will eventually contact the protuberance 115 thereby preventing further rotation and loss of the knurled nut 89. The spring 113 is in the form of a circular washer, having a D-shaped opening which fits against a corresponding flattened portion 81 of the shaft 86 so that this spring washer cannot rotate. If it is desired to remove the nut 89, a forcible turning thereof will make the protuberance 115 ride over the end of the spring.

It will be evident that herein is provided a casting reel from which the line can be unwound without rotating the spool, thereby enabling the fisherman to cast the bait or lure a longer distance with a lighter bait or lure. This reel also enables a more accurate cast and better control and, therefore, will place the bait or lure on the water in such a manner that the fish will not be frightened away.

Twisting and consequent tangling of the line is also avoided and an undesirable backlash is eliminated. In this invention it is not necessary for the fisherman to use his thumb to brake the rotation of the spool which often causes burning or cutting of the skin and retards distance. Unless proper thumb action is applied to most reels, backlash occurs and it requires a great deal of expert technique to properly apply this thumb pressure. All of these operations are either eliminated or simplified by the improved fishing reel of this invention.

Due to the practically instantaneous shifting of the spool from winding position to casting position and back again and due to the very free movement of the line off the flange of the spool, no spinning guide for the line is required. The fact that the spool can be practically instantaneously locked against rotation and as instantaneously released, enables a much better control of the entire casting and fishing operation regardless of the environment.

The spool itself is fastened on its shaft in such a manner that it can be turned end for end quickly and efficiently. In this manner, undesirable twisting of the line, due to repeated casting operations, is very simply eliminated by periodic reversal of the spool positioning whenever such is deemed necessary.

We are aware that many changes may be made and numerous details of construction varied throughout a wide range without departing from the principles of this invention and we, therefore, do not purpose limiting the patent granted hereon otherwise than as necessitated by the prior art.

We claim as our invention:

1. A fishing reel comprising upper and lower housings, means on the lower housing for mounting the reel on a fishing rod, a swiveled connection between housings, said connection including a spindle rotatably mounted in the lower housing, means for fixing the lower end of the upper housing to the upper end of said spindle, a thumb lever pivotally mounted in the lower housing, said thumb lever including integral gear teeth, a gear fixedly mounted on the spindle and in mesh with the teeth on the thumb lever, a projection on the thumb lever, a plate on the lower face of the upper housing adapted to move therewith, a projection and a notch in said plate adapted to cooperate with the projection on the thumb lever for locking the assembly in normal fishing position and a second plate on the upper face of the lower housing also having a notch therein adapted to align the projection on the thumb lever with the notch in the plate on the upper housing.

2. A device as described in claim 1 wherein the upper housing encloses a set of gears, shafts for the gears, one of the shafts projecting from one face of the upper housing, an operating handle mounted on said shaft, another shaft projecting from the opposed face of the housing, and a line holding spool removably mounted on said shaft.

3. A device as described in claim 2 wherein the handle supporting shaft is provided with a clutch for controlling the amount of drive transmitted to the gears from the handle and the consequent tension on the line and an adjusting nut for the clutch.

4. A device as described in claim 2, wherein locking means for the gears are provided in the upper housing, said locking means including a projection extending from an opening in the housing.

WILLIAM H. MORGAN.
JOHN P. ETCHEVERRY.

REFERENCES CITED

The following references are of record in the file of this patent:

UNITED STATES PATENTS

| Number | Name | Date |
|---|---|---|
| 831,745 | Rice | Sept. 25, 1906 |
| 1,114,084 | Wells | Oct. 20, 1914 |
| 1,617,543 | Roberts | Feb. 15, 1927 |
| 1,621,003 | Dodd | Mar. 15, 1927 |
| 2,120,190 | Rickards et al. | June 7, 1938 |
| 2,136,438 | Horsrud | Nov. 15, 1938 |
| 2,463,591 | Bauer | Mar. 8, 1949 |
| 2,498,626 | Bivans | Feb. 21, 1950 |
| 2,549,029 | Stalder | Apr. 17, 1951 |

FOREIGN PATENTS

| Number | Country | Date |
|---|---|---|
| 30,052 of 1912 | Great Britain | Aug. 14, 1913 |
| 385,769 | Great Britain | Jan. 5, 1933 |
| 649,232 | France | Aug. 27, 1928 |
| 813,087 | France | Feb. 15, 1937 |